(12) United States Patent
Singh (10) Patent No.: US 10,666,664 B2
(45) Date of Patent: May 26, 2020

(54) SYSTEM AND METHOD OF PROVIDING LOCATION-BASED PRIVACY ON SOCIAL MEDIA

(71) Applicant: PCMS Holdings, Inc., Wilmington, DE (US)

(72) Inventor: Mona Singh, Cary, NC (US)

(73) Assignee: PCMS Holdings, Inc., Wilmington, DE (US)

( * ) Notice: Subject to any disclaimer, the term of this patent is extended or adjusted under 35 U.S.C. 154(b) by 124 days.

(21) Appl. No.: 15/523,199

(22) PCT Filed: Oct. 27, 2015

(86) PCT No.: PCT/US2015/057515
§ 371 (c)(1),
(2) Date: Apr. 28, 2017

(87) PCT Pub. No.: WO2016/073240
PCT Pub. Date: May 12, 2016

(65) Prior Publication Data
US 2017/0339162 A1   Nov. 23, 2017

Related U.S. Application Data

(60) Provisional application No. 62/076,350, filed on Nov. 6, 2014.

(51) Int. Cl.
*G06F 7/04* (2006.01)
*H04L 9/32* (2006.01)
(Continued)

(52) U.S. Cl.
CPC .......... *H04L 63/107* (2013.01); *G06Q 50/01* (2013.01); *H04L 63/108* (2013.01)

(58) Field of Classification Search
CPC ...... H04L 63/107; H04L 63/108; G06Q 50/01
(Continued)

(56) References Cited

U.S. PATENT DOCUMENTS

| 5,132,902 A | 7/1992 | Williams |
| 8,448,072 B1 * | 5/2013 | Lai ................. G06Q 10/107 715/753 |

(Continued)

FOREIGN PATENT DOCUMENTS

WO   2014172827   10/2014

OTHER PUBLICATIONS

Notification of Transmittal of the International Search Report and the Written Opinion of the International Searching Authority, or the Declaration, dated Jan. 21, 2016 for PCT/US2015/057515, pp. 13 pages.

(Continued)

*Primary Examiner* — Aravind K Moorthy
(74) *Attorney, Agent, or Firm* — Invention Mine LLC (57) ABSTRACT

Systems and methods are described that permit social media users to delay posting social media updates to various social media recipients based on location privacy concerns. In one embodiment, a social media update created by a user is received. A location-based suggested time delay associated with a social media recipient is generated. The user is presented with the location-based suggested time delay, and a user-selected time delay is received. The social media update is sent to the social media recipient only after the user-selected time delay elapses.

20 Claims, 7 Drawing Sheets

(51) Int. Cl.
*G06F 15/173* (2006.01)
*H04L 29/06* (2006.01)
*G06Q 50/00* (2012.01)

(58) Field of Classification Search
USPC .................. 726/3, 4; 713/168; 709/224, 225
See application file for complete search history.

(56) References Cited

U.S. PATENT DOCUMENTS

| | | | |
|---|---|---|---|
| 8,726,142 B2 | 5/2014 | Piantino | |
| 9,070,169 B2* | 6/2015 | Satalkar | G06Q 10/10 |
| 2012/0124139 A1* | 5/2012 | Dempski | G06Q 30/02 |
| | | | 709/205 |
| 2012/0246054 A1* | 9/2012 | Sastri | G06Q 40/06 |
| | | | 705/37 |
| 2013/0132384 A1* | 5/2013 | Bohm | G06Q 10/10 |
| | | | 707/736 |
| 2013/0275348 A1 | 10/2013 | Booth | |
| 2013/0340089 A1* | 12/2013 | Steinberg | H04L 63/10 |
| | | | 726/27 |
| 2014/0012574 A1* | 1/2014 | Pasupalak | G06F 17/30554 |
| | | | 704/235 |
| 2014/0109185 A1* | 4/2014 | Burke | G06Q 50/01 |
| | | | 726/4 |
| 2014/0250114 A1 | 4/2014 | Piantino | |
| 2014/0229544 A1* | 8/2014 | Evans | G06O 50/01 |
| | | | 709/204 |
| 2014/0245352 A1 | 8/2014 | Tseng | |
| 2014/0280579 A1* | 9/2014 | Auger | H04W 4/21 |
| | | | 709/204 |
| 2014/0280637 A1* | 9/2014 | Hamilton, II | H04L 51/32 |
| | | | 709/206 |
| 2015/0023161 A1* | 1/2015 | Alisawi | H04W 76/10 |
| | | | 370/230 |
| 2015/0089661 A1* | 3/2015 | Taschek | G06Q 50/01 |
| | | | 726/26 |
| 2015/0127422 A1* | 5/2015 | Berman | G06Q 30/0273 |
| | | | 705/7.29 |
| 2015/0156236 A1* | 6/2015 | McCall | H04L 65/60 |
| | | | 709/204 |
| 2015/0178920 A1* | 6/2015 | Garnavi | G16H 50/30 |
| | | | 600/476 |
| 2015/0237464 A1* | 8/2015 | Shumaker | H04L 51/20 |
| | | | 709/204 |
| 2015/0281159 A1* | 10/2015 | Abuelsaad | H04L 51/20 |
| | | | 709/206 |
| 2015/0281307 A1* | 10/2015 | Hartwell | H04L 65/604 |
| | | | 709/219 |
| 2015/0296033 A1* | 10/2015 | Jung | G06Q 50/01 |
| | | | 709/217 |
| 2015/0317752 A1* | 11/2015 | Di Pierro | G06Q 50/01 |
| | | | 705/319 |
| 2015/0347593 A1* | 12/2015 | Tsai | G06F 16/9535 |
| | | | 707/722 |

OTHER PUBLICATIONS

Vahl, Andrea, "8 Tips for Using Facebook Scheduled Posts", dated Aug. 14, 2012, retrieved from http://www.socialmediaexaminer.com/facebook-scheduled-posts/.
Allton, Mike, "How to Craft and Schedule Social Media Posts using HootSuite", dated Oct. 1, 2013, retrieved from http://blog.hootsuite.com/hootsuite-review-schedule-social-media/.
International Preliminary Report on Patentability for PCT/US2015/057515 dated May 19, 2017.

* cited by examiner

SYSTEM AND METHOD OF PROVIDING LOCATION-BASED PRIVACY ON SOCIAL MEDIA

CROSS-REFERENCE TO RELATED APPLICATION

The present application is a 35 U.S.C. 371 of International Application of PCT PCT/US2015/057515, entitled SYSTEM AND METHOD OF PROVIDING LOCATION-BASED PRIVACY ON SOCIAL MEDIA, filed on Oct. 27, 2015, which claims benefit under 35 U.S.C. § 119(e) from, U.S. Provisional Patent Application Ser. No. 62/076,350, filed Nov. 6, 2014, the entire disclosure of which is incorporated herein by reference.

FIELD

This disclosure relates to systems and methods for sharing media objects via online social networks and to user interfaces for conducting such sharing.

BACKGROUND

Social media has become an integral part of modern life. Social media services, such as Facebook, Google+, LinkedIn, and others, allow users to keep friends, acquaintances, and even the general public up to date on their current life events; from weddings to divorces, from checking in to the labor and delivery unit at a hospital to checking out at a funeral, and from getting home from work to leaving home for a long vacation. Some examples of social media updates include text-based status updates, videos, pictures, location check-ins, and friends tagging, or associating, the user with a particular post.

Social media provides the user the ability to communicate with many people; however, sharing updates on social media sites leads to privacy issues, including location privacy issues. The user's location information can be divulged in a variety of ways using social media. A user on vacation away from home may update a social media service with text updates about where they are at or may post pictures and videos. The user's location can be revealed explicitly (e.g. a text update stating, "Just landed in Hawaii! Great Vacation Weather!"), implicitly (e.g. a photograph of the user normally residing in New York standing in front of the Eiffel Tower), or through hidden or non-hidden metadata embedded in the social media post (e.g. time and location metadata stored in a pictures data or a social media update automatically tagged with the user's location).

SUMMARY

In popular social media systems, a user's location may be divulged to anyone receiving the social media update. This may lead to other people becoming aware that the user is away from home and put the user's home at risk of burglary. A user can control his location privacy information by delaying sharing any information via social media until the privacy concern is removed. However, this removes the excitement of posting and sharing the information in real time. Popular social media platforms permit users to only post social media updates to select groups of people and to schedule future posts. However, these features lack an adaptive component and are not dependent on the intended recipients and do not take into account the user's location.

This disclosure relates to systems and methods for sharing media objects via online social networks to various groups of people at different points in time. The time that the media object becomes available to others depends on the privacy determination for each contact on the friends list. The media sharing is controlled by a location privacy risk associated with the individuals and groups.

The present disclosure provides systems and methods that allow users to adaptively control which recipients are permitted to see social media updates at various times based on several factors, including location, time, and level of trust between the social media user and recipients. The time when a social media object, or status update, becomes available to others depends on the privacy determination for each person in the user's friends list.

In an embodiment, the user takes a photograph of a famous landmark while on vacation and uploads the photograph to a social media platform. The picture would be made available to a select group of people immediately. The select group may include the following, for example:
  close friends and family,
  friends whom the user has already told of the trip,
  friends with whom the user has previously shared a picture from the trip, and
  friends with whom the user has previously shared a picture from a prior vacation while on that vacation.

The social media update may also be shared with other users at later times. The later time may be dependent on a variety of different factors. In some embodiments, the picture becomes visible to other friends when the user arrives home, or after a sufficient time period has lapsed. The time period could be dependent on the distance of the user when the photograph was taken (measured by meta-data within the photograph, location of the user's mobile device when the photograph was taken or uploaded) and the user's home. The photograph may also become visible to other friends when the user is scheduled to arrive home or when the user arrives home. In some embodiments, it may be possible for the post to never be available to select people. This embodiment would be beneficial if, for example, the user is passing through a town for business reasons, but chooses not to reveal to family members in that town that he visited.

DETAILED DESCRIPTION

Embodiments of the present disclosure enable users to selectively permit different users to view social media updates on different timelines. The process for sharing information considers information object, location and mobility, and social-cognitive relationship. The term 'social media update' encompasses various different types of social media updates. Examples of present social media updates include: photographs, videos, text status updates, and the social media updates of friends that tag, or associate the user with, the update.

In an exemplary implementation, the user is presented with an interface when uploading a social media update. The user interface includes a timeline, and the user moves or places other friends and groups along the timeline. The social media update is then shared with the friends and groups according to the timeline as specified by the user. Subsequent comments about the social media update are also released to the other friends and groups as the original update.

In an exemplary implementation, the user is presented with an interface when uploading a social media update. The user interface includes a timeline with a suggested time delay for various friends and groups along the timeline. The user is able to edit the suggested timeline, moving friends and groups along the timeline to override the suggestions. The user's friends and groups are able to see the social media update based on the suggested timeline, and if edited, based on the edited timeline. Future suggestions for timeline delays also include the edits made by the user. For example, if friend "Matt" is edited to have the update visible later than suggested, and friend "Dan" is edited to have the update visible earlier than suggested, suggestions for subsequent posts will incorporate the edits and responsively include friend "Matt" later along the timeline and friend "Dan" earlier along the timeline.

Figure 1:
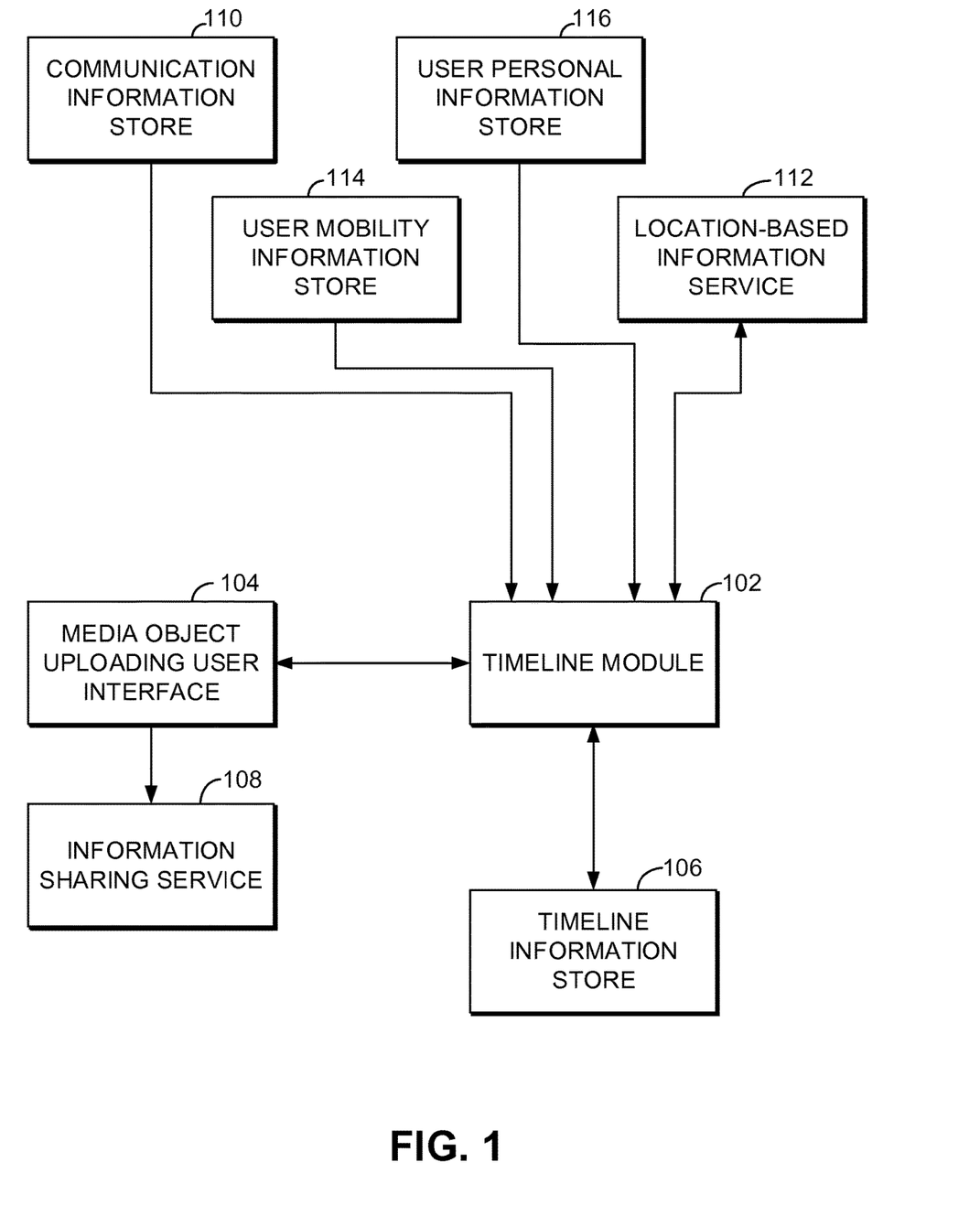
FIG. 1 is a schematic block diagram illustrating the components of a system able to determine a suggested timeline, according to some embodiments.

FIG. 1 illustrates a functional architecture of an exemplary system for determining a suggested timeline. A timeline module 102 receives a social media update to be uploaded from a user interface 104 along with any available metadata for the social media update and any recipient group. The timeline module 102 responds with a suggested timeline to the user interface that shows a distribution over time of members of the provided recipient group or shows a distribution over time of all friends of the user, if no recipient group is provided. The user may edit the suggested timeline, allowing different friends or groups to see the social media update at a different time than suggested. The user then selects the suggested timeline or the edited timeline. The social media update is then able to be viewed by the friends and groups according to the duration displayed on the timeline. The timeline module also stores the selected timeline along with any metadata for future use in a timeline information store.

The media object uploading user interface 104 depicted in FIG. 1, also referred to as the user interface, works with the user to determine what media object to upload, determines whether there is a target recipient group, and offers the user the ability to reorder, or edit, the timeline. The media object uploading user interface 104 also interacts with the timeline module 102 by providing the timeline module 102 relevant information such as metadata location and selected friends and groups, receiving timeline suggestions from the timeline module 102, and providing the final selected timeline to the timeline module. The media object uploading user interface 104 also invokes the information sharing service 108 and provides the final selected timeline to the information sharing service 108.

The information sharing service 108 receives the media object, or social media update, and shares it with the selected friends and users according to the selected timeline. The information sharing service may be built in to the functionality of an existing social media platform, or it may be a separate service built on top of an existing social media platform.

The communication information store 110 depicted in FIG. 1 provides history of prior communication between the user and the user's friends on social media platforms. By way of example and not limitation, the prior communication may be via the social media platform, email, instant messaging, text messaging, or voice calls. The functions of the communication information store may be integrated with the social media platform or built in to the user's device. The prior communication history between the user and other friends is provided to the timeline module 102 by the communication information store 110.

A location-based information service 112 depicted in FIG. 1 provides external information given a location and optionally a time. In some embodiments, the external information includes a list of points of interests near a location or events, such as concerts happening near a location at a specified timeframe. The external location data is provided to the timeline module 102.

A user mobility information store 114 depicted in FIG. 1 provides historical information of the locations the user has visited. The user's location information may be derived from a variety of sources. Exemplary sources include location data obtained by the user's mobile device, location check-ins made on social media platforms, emails sent by or to the user indicating travel plans, calendar events associated with a location, and the user's stored address for home and work. The user mobility data is provided by the user mobility information store 114 to the timeline module.

A user personal information store 116 provides the timeline module with information typically stored by personal information management applications, such as corporate and personal calendars.

The timeline information store 106 stores the selected timelines along with relevant features, such as media object features (e.g. the object's metadata or some attributes computed from the object's metadata), and social relationship features (e.g. the number and nature of communications with the various recipients).

In an exemplary embodiment, the timeline module 102 receives a social media update, along with the associated metadata, and the list of recipients. The list of the recipients is either selected by the user or comprises all of the user's friends on the social-media platform. The timeline module 102 may also suggest to the user a list of friends to receive the social media update.

The timeline module 102 also determines relevant object location phrases. The timeline module retrieves a list of points of interest near the associated location of the social media update from the location-based information service 112. The timeline module combines the location-indicating words mentioned in the social media update's caption with point-of-interest locations retrieved from the location-based information service 112.

In some embodiments, the timeline module also determines a communication score for each recipient. In exemplary embodiments, the communication score is related to the frequency of communication between the user and the recipient. The frequency of the communication may be filtered by communications that refer to the social media update's associated location that occurred within a specified time period. As an example, the communication score may be set to the following level based on the number of communication occurrences during the specified time period:

0.8 if no occurrences
0.5 if 1-2 occurrences
0.2 if 3-5 occurrences
0.1 if 6 or more occurrences In some embodiments, the timeline module 102 also determines a base-line distance-based delay to be incorporated into the suggested timeline. In an exemplary embodiment, the timeline module retrieves the user's primary locations as most frequent stable location coordinates from the user mobility information store 114 by finding circular regions of diameter less than 10 miles where the user stayed for longer than 3 hours each day for more than 80% of the days out of the previous 3 months. The user's primary location may also be determined from the user's personal information store 116 by finding locations mentioned in a calendar entry or the address of a contact entry and determine the location coordinates for those locations. The timeline module 102 determines the distance from the object location coordinates to the centers of the nearest of the primary regions. The base-line distance-based delay is set at the following exemplary distances between the primary region and the social media update's associated location.

No Delay if <50 miles
1 day delay if 50-100 miles
2 day delay if 101 to 250 miles
3 day delay if 251-500 miles
4 day delay otherwise.

In an exemplary embodiment, the timeline module 102 also determines point-of-interest and event categories. The timeline module 102 retrieves location information associated with the social media update and the point-of-interest location-based information from the location-based information service. The retrieved information may be used to determine the relevant point-of-interest categories (e.g., restaurant, bar, park, trail, hospital, maternity ward) reflecting the set of point of interests within a specified distance, e.g., 1 mile, of the location coordinates. The retrieved information may further be used to determine the relevant event categories (e.g., concert, political convention, press conference) from the set of events occurring within a specified distance, e.g., 1 mile, of the location coordinates within a specified time interval, e.g., from before 3 hours to after 2 hours of the time associated with the social media update.

In an exemplary embodiment, the timeline module 102 also determines a suggested delay for each recipient. In such an embodiment, the timeline module calculates a distance-communication composite score for the social media update and recipient pair as the product of the base-line distance-based delay and the communication score for the recipient. The timeline module 102 checks the timeline information store 106 for information regarding the intended recipient. If there is no previous information regarding the recipient in the timeline information store, the suggested delay is based on the distance-communication composite score.

If there is prior information regarding the recipient, the determined suggested delay for the recipient may be based on several factors. In such an embodiment, the timeline module 102 may retrieve the following information associated with the recipient:

A distance-communication weight, if any; otherwise 0.5,
A point of interest-event weight, if any; otherwise 0.5,
The point of interest-event score as the average delay for this recipient for social media updates of the same point of interest category or the same event category as the present media object.

In an exemplary embodiment, the timeline module 102 uses the retrieved information to determine a suggested delay for the recipient as the minimum of the two components of the delay. The components include the product of the distance-communication weight and the distance-communication composite score, and the product of the point of interest-event weight and the point of interest-event score. The suggested delay is provided to the user interface 104. After a user has determined a selected delay by either approving of or modifying the suggested delay, the timeline module 102 receives the selected delay from the user interface 104.

If the selected delay matches the suggested delay for a recipient, no further processing is needed with respect to that recipient, and the recipient will be able to view the social media update according to the selected timeline. If the selected delay does not match the suggested delay for a recipient, the recipient's distance-communication and point of interest-event weights may be adjusted. In an exemplary embodiment, the minimum of the recipient's distance-communication and point of interest-event weights is adjusted to the corresponding weight so that the suggested delay would have equaled the selected delay. If both values are equal, this adjustment is applied to both weights. The maximum of the recipient's distance-communication and point of interest-event weights may be adjusted to be, for example, the square root of the adjustment to the minimum component's adjusted weight.

The timeline module 102 may then update the timeline information store 106. The update may include the social media update point of interest and event categories, the selected delays for each recipient, and each recipient's updated distance-communication and point of interest-event weights (overwriting the previous weights, if any and if required).

The techniques described with respect to FIG. 1 may be implemented using various different types of information input and various different user interfaces. The methods disclosed are exemplary methods for determining a suggested timeline, which may be displayed on any of the exemplary user interfaces disclosed herein or additional user interface formats.

In an exemplary implementation, the user can specify that pictures taken from a certain city are never to be shared with potential recipients based in that city. This helps to preserve the user's privacy with respect to having visited that city. For example, a user visiting Denver may wish to avoid meeting relatives or former colleagues living in the area, and may also wish to avoid letting them know he was there.

In another example, the user can specify that pictures taken from a certain city are never to be shared with potential recipients (irrespective of where they are based). This helps to preserve the user's privacy with respect to having visited that city. For example, the user may not want social media participants to know of a trip to Las Vegas.

In some embodiments, the user is provided with the ability to create rules which prohibit the sharing, with a social media recipient or multiple social media recipients, of social media updates associated with particular locations. The particular locations can be physical locations, such as a particular city or place of business, or may be a general category of locations, such as a casino or nail salon. The locations are correlated to the social media recipients that are barred from having the social media update shared with them.

In an exemplary embodiment, a user may create a rule which prohibits his social media recipients that are extended family from seeing social media updates that correlate to locations near the extended family. This example may be useful when the user does not wish to let the extended family know that he is traveling through town and does not have time to visit and does not wish to alert the extended family of his visit. In another example, a user creates a rule that prohibits that user's significant other, and the significant other's friends, from seeing social media updates that have a determined location which correlates to a particular category of locations. This example may be useful when the user's significant other becomes upset when the user visits a particular category of locations, such as casinos, establishments that serve alcohol, churches, etc. The rules may be implemented with the use of a database that associates social media contacts (e.g. "friends") with one or more locations.

In various embodiments, the user is presented with a user interface and a suggested timeline based at least in part on object metadata associated with the social media update. The object, or social media update, metadata can include information such as location metadata of the media object. Location metadata can include, for example, information embedded in a photograph or video indicating the location at which the photograph or video was captured. Metadata can further include a user's comments (e.g. an image caption), which may include information identifying a location and, in some instances, the user's relationship to the location (e.g. a caption reading "looking forward to visiting" may be interpreted differently than a caption reading "enjoying my visit"). In some embodiments, POI (point of interest) information is associated with the media object. For example, a picture taken in the vicinity of a national park may not be immediately shared. Metadata may further include information regarding events occurring in the timeframe and location associated with the media object. For example, if there is a concert near where a picture or video is recorded, that might be a reason to post it right away to receive comments from others.

In an exemplary embodiment, the suggested timeline is based at least in part on the user's mobility. For example, the social media update may be associated with metadata that includes location information, and this location may be compared to a set location, such as the user's home or office. Exemplary factors to be analyzed include the distance of the location in the metadata of the social media update from one or more primary locations of the user and the frequency that the user visits the location associated with the metadata.

In embodiments that suggest a timeline based on the user's mobility, various factors can contribute to a determination of when the social media update will be made accessible to (shared with) the user's friends and groups. These factors can provide for the following outcomes, among other examples:

Sharing occurs when the user arrives at a specified location (e.g., home).

Sharing occurs when the user arrives at a specified type of a location, of which there are many (e.g., corporate office, restaurant, Greek restaurant, airport, duty free shop, or lounge).

Sharing occurs when the user has left a specified location (e.g., "share one hour after I depart from the conference venue").

Sharing occurs in anticipation of the user arriving at a specified location (e.g., "share one hour before I arrive at my sister's home").

Sharing occurs when some composite condition holds (e.g., "share these pictures when I get home or within a day at the latest").

In an exemplary embodiment, the suggested timeline user interface is based on social relationships and based on location information associated with the social media update. The suggested timeline of friends and groups is prioritized based on the prior interactions with the user regarding the user's presumed presence at or near the location associated with the location of the social media update.

In an exemplary embodiment, the location metadata of the social media update is compared to previous location information shared with the friends and groups. When a user has previously sent an email message to a friend referring to a particular location, that friend will be suggested to see the social media update containing location metadata at an earlier time. Similarly, if the user has frequent correspondence with a friend or mentioned the location to the friend, that friend will be suggested to see the social media update containing location metadata at an earlier time. A group suggestion is suggested for the latest release of the social media update for all of the group's members. In this way, no member of a group will have earlier access to an update than he would have absent his membership in the group.

In an exemplary embodiment, the user selects a group that will be able to view the social media update. Next, the suggested timeline displays the members of the group along the timeline. The suggested time delay may be determined by the methods described above in conjunction with FIG. 1.

Figure 2:
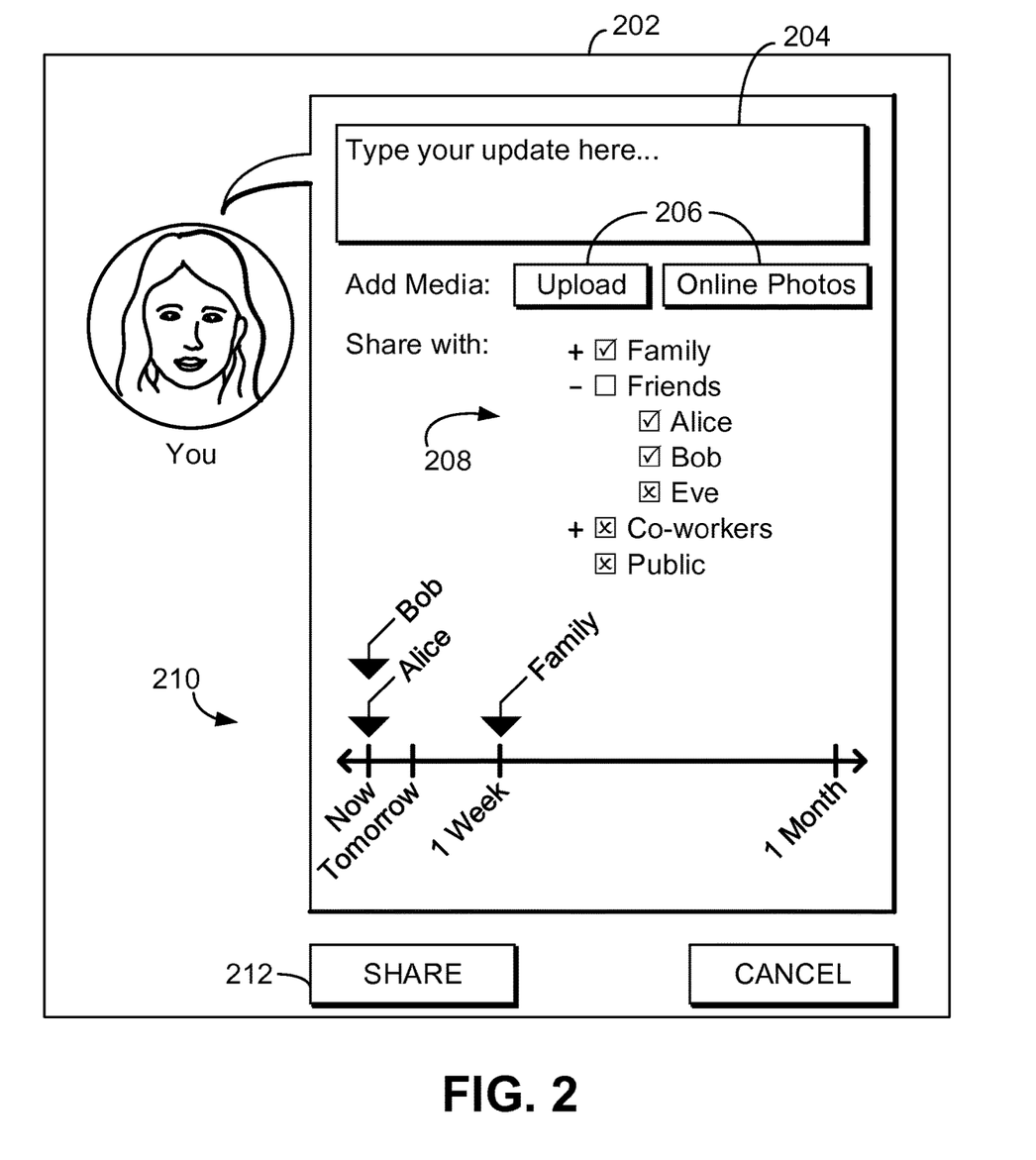
FIG. 2 is an exemplary user interface with a timeline, according to some embodiments.

FIG. 2 illustrates an exemplary user interface 202. The user interface 202 is presented in some embodiments to the user when creating, or uploading, a social media update. The user interface 202 includes a field 204 allowing the user to enter text updates. Buttons 206 allow the user to attach media files, such as images and videos, as social media updates. The media files may be uploaded from the user's own computing device, or they may be provided from an online store of media files (e.g. an online photo gallery). A recipient selection interface 208 permits the user to select friends, groups of friends, or other individuals or collections of social media participants which whom the social media update is to be shared. In some embodiments, the recipient selection interface includes a text box in which the user can enter names and/or email addresses of selected social media participants. In some embodiments, the recipient selection interface includes a menu interface through which users can select social media participants (e.g. by checking or unchecking boxes corresponding to each participant and/or group of participants). In the example of recipient selection interface 208, all participants in the group "Family" have been selected to receive an update, while only some participants in the group "Friends" have been selected (namely Alice and Bob, but not Eve). Neither the "Co-Workers" group nor the "Public" group has been selected to receive the update.

The exemplary user interface 202 further includes a timeline interface 210. The exemplary timeline interface 210 includes suggested times for a social media update to be shared with friends Bob and Alice and with members of the group Family. Specifically, a suggested delay for sharing with Bob and Alice is zero, while a suggested delay for sharing with Family members is one week. As no text has yet been entered by the user in the text interface 204 in this example, the suggested delay may be based on, for example, a user's history of selecting zero delay for friends Bob and Alice, and selecting a one-week delay for Family members. The suggested delay may also be based, at least in part, on the user's current location. For example, the timeline module 102 may determine that the user is at a location distant from the user's home, and that Alice and Bob have already been informed of the user's travels, but that at least one member of the Family group has not been informed of the user's travels. The user can accept the suggested timeline or can reposition Bob, Alice, and/or Family along the timeline. The repositioning along the timeline can be conducted by, for example, dragging the names along the timeline with a cursor or touch screen, or by using arrow keys, for example.

Once the user has drafted the social media updated and is satisfied with the selected delays illustrated on the timeline, the user can share the update, e.g. by selecting the "Share" button 212.

Figure 3:
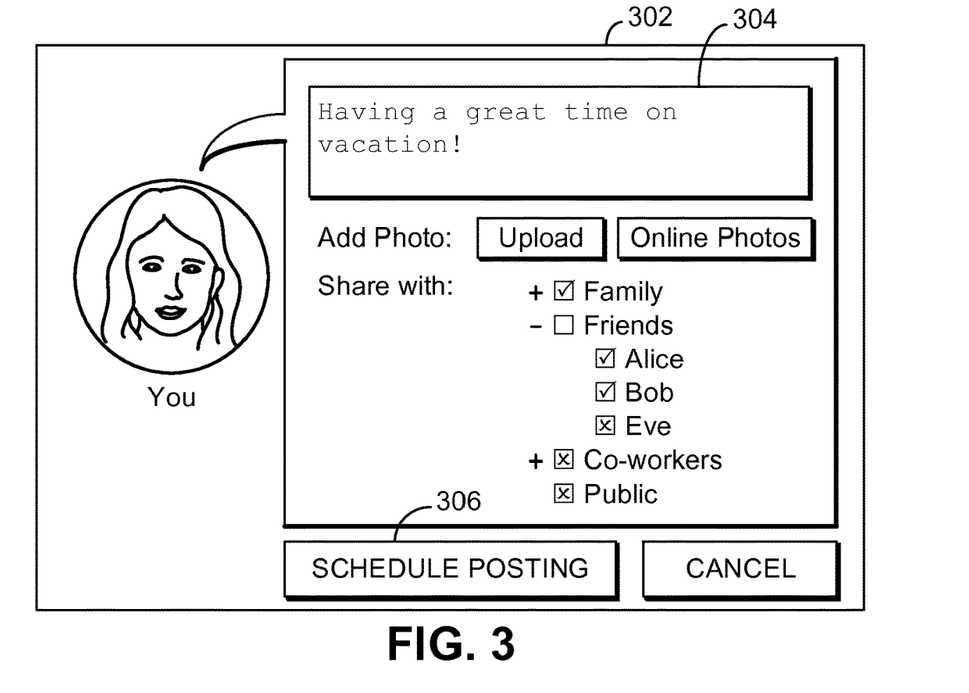
FIG. 3 is an exemplary user interface with for entering a social media update and selecting recipients, according to some embodiments.

FIG. 3 illustrates an alternative user interface 302. In the embodiment of FIG. 3, the user interface 302 is used for the generation of the social media update and the selection of recipients, and the user proceeds to a separate user interface for selection of the timeline (see, e.g., FIG. 4). In the user interface 302, the user has entered text of a social media update ("Having a great time on vacation!") in text field 304. Once the social media update has been drafted, the user selects a "Schedule Posting" button 306.

Figure 4:
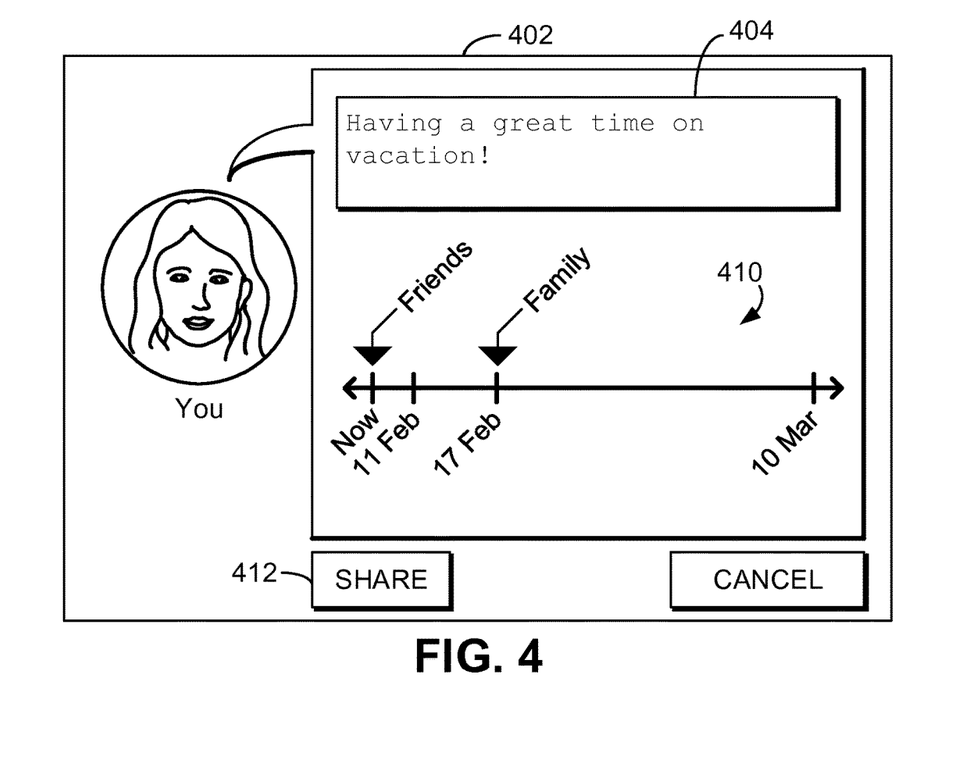
FIG. 4 is an exemplary user interface with a suggested timeline displaying multiple groups, according to some embodiments.

FIG. 4 illustrates an exemplary user interface 402 for scheduling sharing of a social media update. In some embodiments, the interface 402 may be reached by selecting a "Schedule Posting" button 306 of FIG. 3. The exemplary user interface 402 includes a timeline 410 that displays suggested delays for sharing of the update with participants in the Friends group and participants in the Family group. The suggested delays may be location-based suggested delays based at least in part on the user's indication in the text field 404 that he is on vacation. The user may accept the location-based suggested delays or may select different selected delays before scheduling the update by selecting the "Share" button 412.

Figure 5:
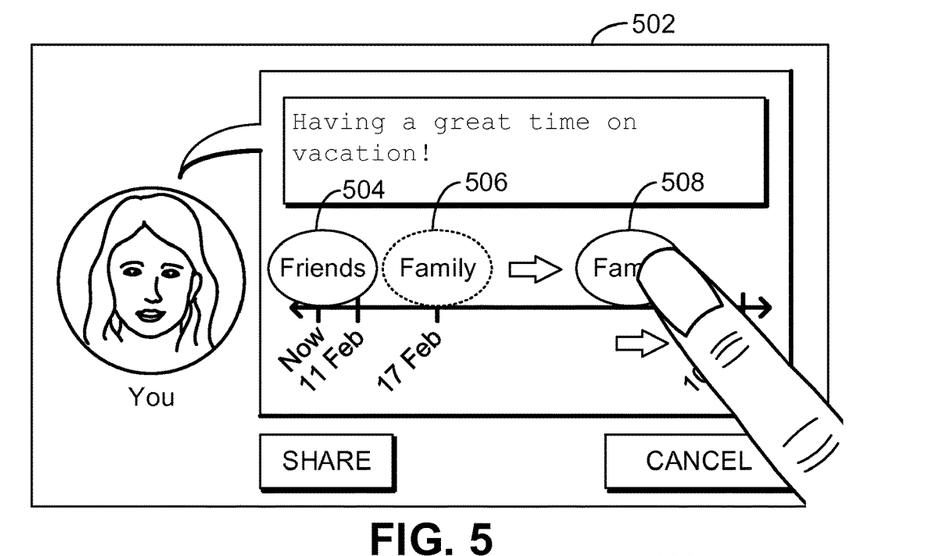
FIG. 5 is an exemplary user interface implemented on a touch screen.

FIG. 5 illustrates an alternative user interface 502. In the user interface 502, different social media participants and/or groups are illustrated using ovals such as the Friends oval 504. Of course, other shapes or icons may alternatively be used as markes. The ovals provide a touchable interface for display on a touch screen, allowing a user to reposition a suggested timeline into a selected timeline. For example, in FIG. 5, the user is using a touch screen interface to reposition the Family marker from position 506 to position 508. This movement increases the delay associated with the Family group from a shorter suggested delay to a longer selected delay.

As further illustrated in FIG. 5, there are different available techniques for labeling the delays. In FIG. 5, the delays are labeled using actual dates (e.g. "11 Feb" and "17 Feb"). By comparison, in FIG. 2, the delays were labeled using relative time periods (e.g. "Tomorrow", "1 Week", "1 Month"). Similarly, updates that are to be posed immediately may be associated with the label "Now", "Today", or other appropriate moniker.

In exemplary embodiments, the timeline may be linear, meaning equal spacing represents equal time durations. However, the timeline may not be linear in various embodiments. It may also involve breaks, indicating a duration of time that is not shown on the timeline. This permits time periods with a large number of friends and groups to be displayed along the timeline. Breaks in the timeline permit large time delays between separate friends and groups to be displayed along the timeline. The various embodiments, the timeline may be interactive. For example, when a user interacts with a group listed on the timeline, such as by hovering a mouse over the group, the group expands to list the individual friends within the group and the timeline shifts to accommodate displaying more names. The timeline may also be scrollable in some embodiments, so that the entire timeline need not be displayed at once.

Figure 6:
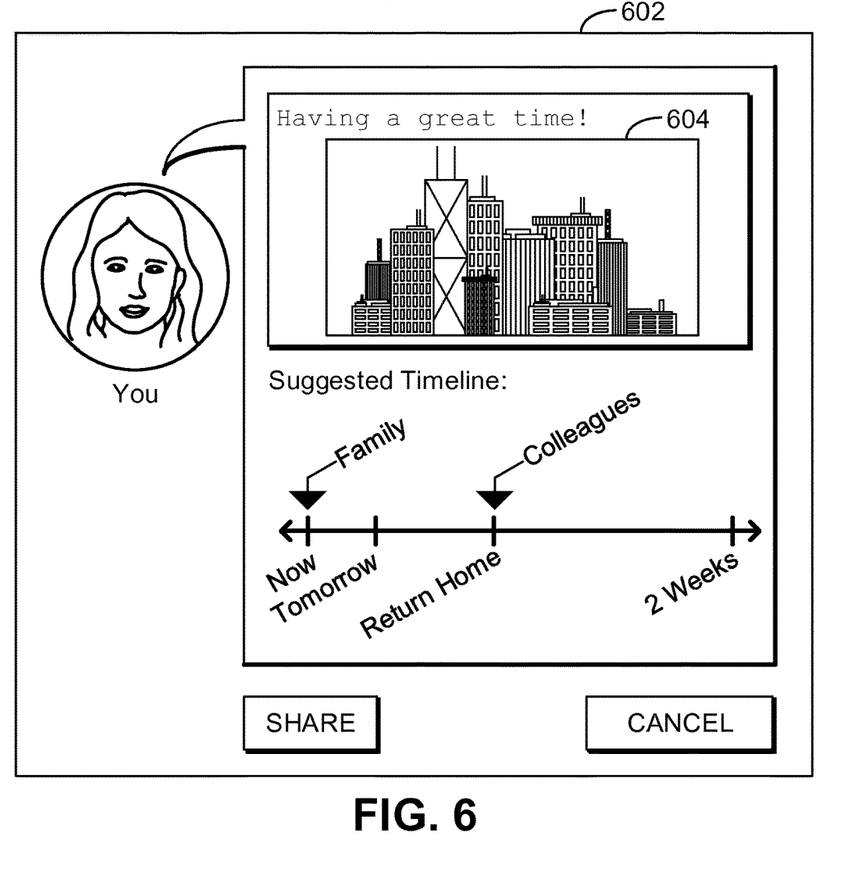
FIG. 6 is an exemplary user interface illustrating a timeline including a calendar event.

FIG. 6 illustrates a further embodiment of a user interface 602. As illustrated in the exemplary interface 602, the user has not specifically mentioned being on vacation in the update text. However, the user has included an image 604 in the social media update. The image 604 may include metadata indicating that the picture was taken recently and was taken at a location distant from the user's home. As a result, the timeline module 102 may generate a suggested timeline in which Family will immediately receive the update, while members of the group Colleagues (e.g. the user's co-workers) will not have access to the update until some amount of time has passed. As is further illustrated in FIG. 6, the timeline may display calendar events instead of or in addition to dates or relative delays. For example, in FIG. 6, the calendar event "Return Home" is displayed on the timeline, and the group Colleagues is suggested to be given access to the update when the user returns home from vacation. The "Return Home" event may be generated manually, or it may be derived automatically from, for example, a user's email history containing flight confirmation.

Figure 7:
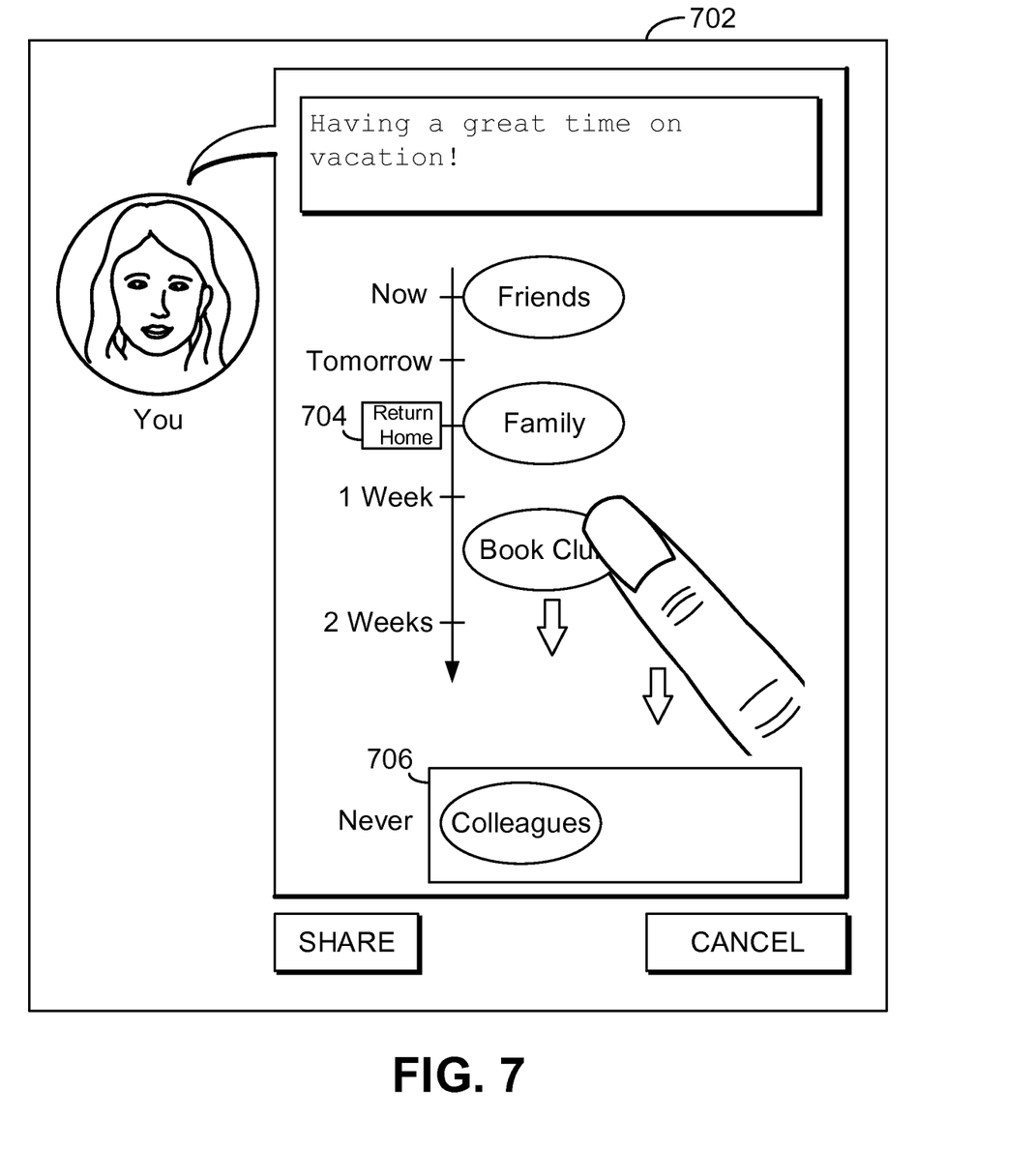
FIG. 7 is an alternative user interface illustrating a timeline including a calendar event.

FIG. 7 illustrates a further alternative user interface 702. In user interface 702, the timeline interface is vertical. Icons or other markers representing social media participants and/or groups are initially presented with location-based suggested delays, and the user is provided with the ability to select a delay by moving (e.g. dragging) the icons or other markers up or down along the user interface. In the example of FIG. 7, the user is increasing the delay associated with the group "Book Club" by dragging the corresponding oval downward. A further feature of user interface 702 is a display of the calendar event "Return Home" 704. The user interface 702 further includes an interface region 706 marked "Never". Shapes or other markers in the region 706 correspond to groups that will not receive the social media update. For example, the marker for Colleagues has been dragged into the "Never" region 706, indicating that the Colleagues group will not receive the social media update. In some embodiments, this may ensure that no member of the Colleagues group receives the update (e.g., a participant who is a member of both Friends and Colleagues would not receive the update). In other embodiments, participants in the Colleagues group may still receive the update if they are otherwise designated to receive the update, e.g. by virtue of membership in a different group that is designated to receive the update (e.g., a participant who is a member of both Friends and Colleagues would receive the update).

Figure 8:
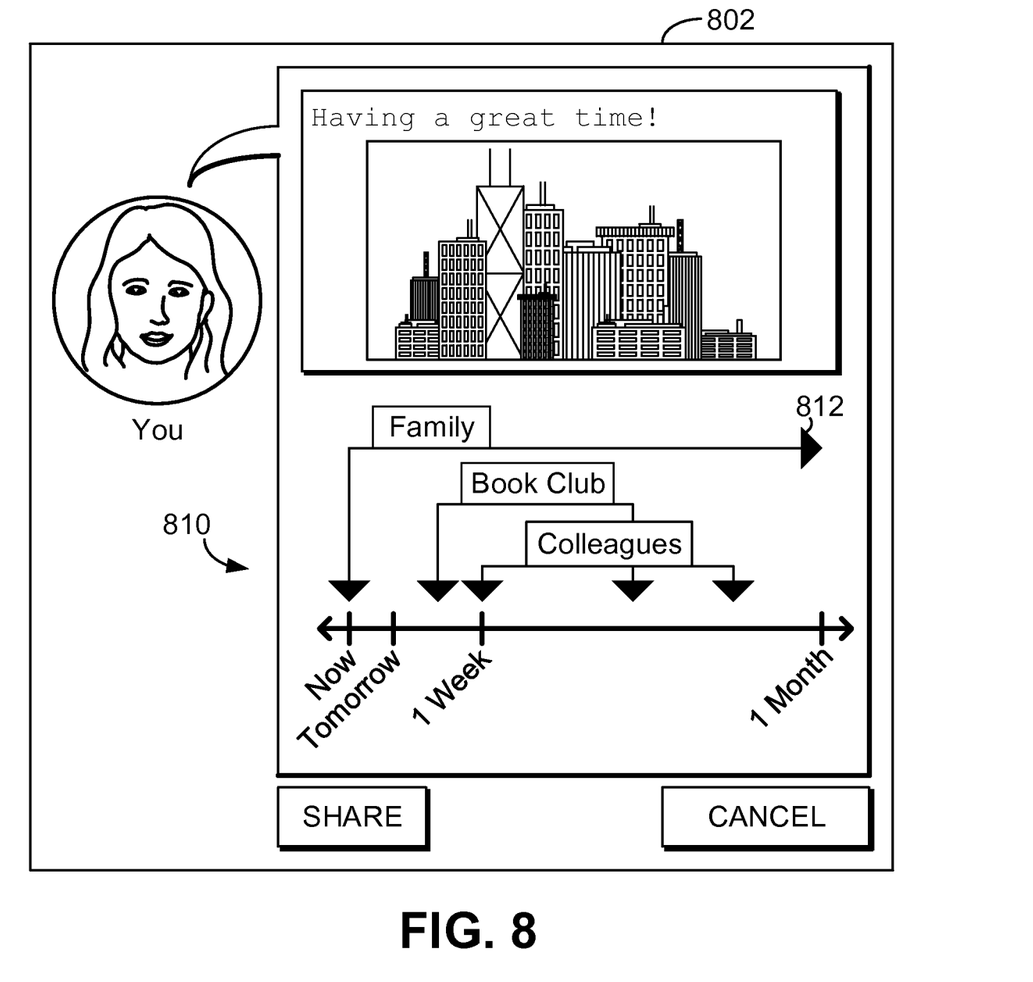
FIG. 8 is an exemplary user interface illustrating a timeline interface with selection of different visibility windows for different groups.

Another exemplary user interface 802 is illustrated in FIG. 8. The user interface of FIG. 8 includes a timeline interface 810. The timeline interface 810 allows a user to select different visibility windows for different social media participants and/or groups of participants. In this way, a user selects not only a delay time after which the social media update will be visible, he also has the option of selecting an end time after which the social media update will no longer be visible. In the example of FIG. 8, no end time is specified for the Family group, but different end times are selected for the Book Club and Colleagues group. This may be arranged because, for example, there may be a turnover of participants in the Book Club and Colleagues group that makes it undesirable for social media postings to be accessible to those groups indefinitely. The interface may react to input as follows. As an example, clicking on or touching a right-pointing arrow such as arrow 81 (indicating indefinite/permanent availability) may cause the arrow to point downward to a specific end time on the timeline, and the user may slide the downward arrow to the left or right to select a different end time.

In exemplary embodiments, the suggested timeline is a function of the user's expected locations. The suggested timeline account for the user's expected location, and displays friends and groups along the timeline, suggesting that social media updates be made visible to the friends and groups according to the methods of this disclosure. The user's expected location is available via tools similar to Google Now, extracting information from emails and calendar events that contain location metadata, such as ticket bookings, hotel reservations, rental cars, etc. Additional sources of relevant location information include calendar entries with a mentioned location, or a contacts database in which the entry for a contact mentions a location, possibly an address for the contact, or the place where the contact was met. The suggested timeline accounting for the user's location may display the user's predicted location along the timeline.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary embodiments disclosed herein are implemented using one or more wired and/or wireless network nodes, such as a wireless transmit/receive unit (WTRU) or other network entity.

Figure 9:
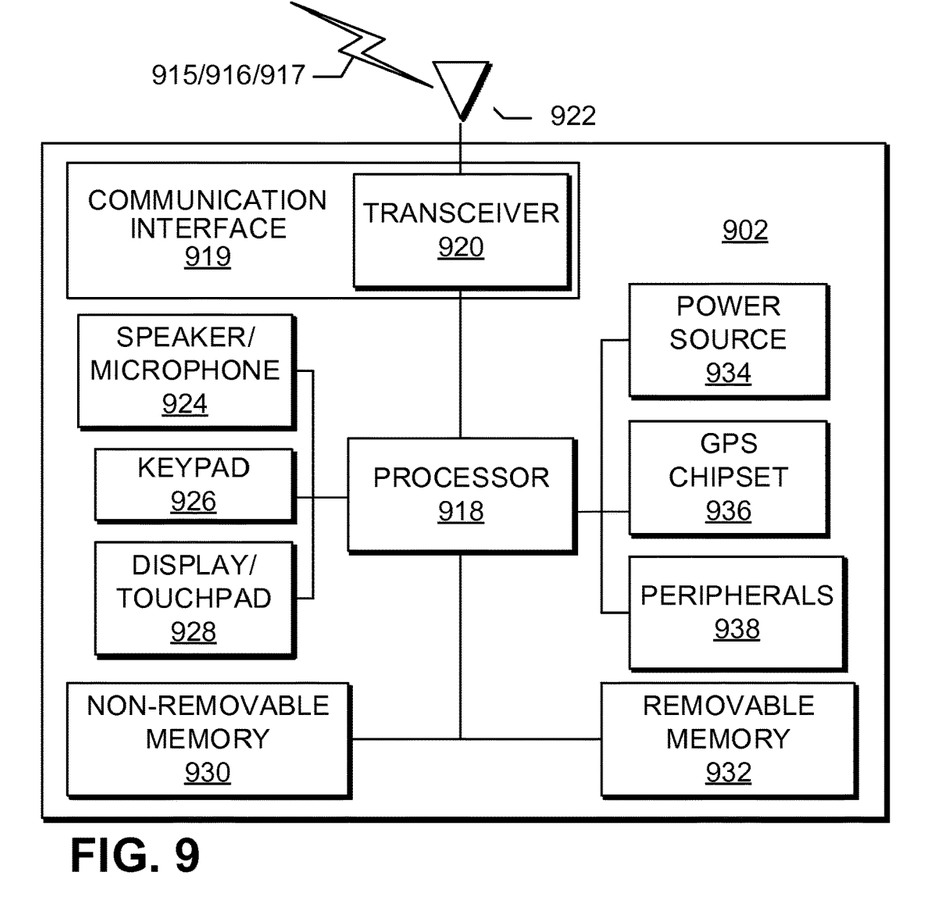
FIG. 9 is a schematic block diagram illustrating the components of an exemplary wireless transmit/receive unit.

FIG. 9 is a system diagram of an exemplary WTRU 902, which may be employed as a user device (e.g. a user device with a social networking application) in embodiments described herein. As shown in FIG. 9, the WTRU 902 may include a processor 918, a communication interface 919 including a transceiver 920, a transmit/receive element 922, a speaker/microphone 924, a keypad 926, a display/touchpad 928, a non-removable memory 930, a removable memory 932, a power source 934, a global positioning system (GPS) chipset 936, and sensors 938. It will be appreciated that the WTRU 902 may include any subcombination of the foregoing elements while remaining consistent with an embodiment.

The processor 918 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 918 may perform signal coding, data processing, power control, input/output processing, and/or any other functionality that enables the WTRU 902 to operate in a wireless environment. The processor 918 may be coupled to the transceiver 920, which may be coupled to the transmit/receive element 922. While FIG. 9 depicts the processor 918 and the transceiver 920 as separate components, it will be appreciated that the processor 918 and the transceiver 920 may be integrated together in an electronic package or chip.

The transmit/receive element 922 may be configured to transmit signals to, or receive signals from, a base station over the air interface 915/916/917. For example, in one embodiment, the transmit/receive element 922 may be an antenna configured to transmit and/or receive RF signals. In another embodiment, the transmit/receive element 922 may be an emitter/detector configured to transmit and/or receive IR, UV, or visible light signals, as examples. In yet another embodiment, the transmit/receive element 922 may be configured to transmit and receive both RF and light signals. It will be appreciated that the transmit/receive element 922 may be configured to transmit and/or receive any combination of wireless signals.

In addition, although the transmit/receive element 922 is depicted in FIG. 9 as a single element, the WTRU 902 may include any number of transmit/receive elements 922. More specifically, the WTRU 902 may employ MIMO technology. Thus, in one embodiment, the WTRU 902 may include two or more transmit/receive elements 922 (e.g., multiple antennas) for transmitting and receiving wireless signals over the air interface 915/916/917.

The transceiver 920 may be configured to modulate the signals that are to be transmitted by the transmit/receive element 922 and to demodulate the signals that are received by the transmit/receive element 922. As noted above, the WTRU 902 may have multi-mode capabilities. Thus, the transceiver 920 may include multiple transceivers for enabling the WTRU 902 to communicate via multiple RATs, such as UTRA and IEEE 802.11, as examples.

The processor 918 of the WTRU 902 may be coupled to, and may receive user input data from, the speaker/microphone 924, the keypad 926, and/or the display/touchpad 928 (e.g., a liquid crystal display (LCD) display unit or organic light-emitting diode (OLED) display unit). The processor 918 may also output user data to the speaker/microphone 924, the keypad 926, and/or the display/touchpad 928. In addition, the processor 918 may access information from, and store data in, any type of suitable memory, such as the non-removable memory 930 and/or the removable memory 932. The non-removable memory 930 may include random-access memory (RAM), read-only memory (ROM), a hard disk, or any other type of memory storage device. The removable memory 932 may include a subscriber identity module (SIM) card, a memory stick, a secure digital (SD) memory card, and the like. In other embodiments, the processor 918 may access information from, and store data in, memory that is not physically located on the WTRU 902, such as on a server or a home computer (not shown).

The processor 918 may receive power from the power source 934, and may be configured to distribute and/or control the power to the other components in the WTRU 902. The power source 934 may be any suitable device for powering the WTRU 902. As examples, the power source 934 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 918 may also be coupled to the GPS chipset 936, which may be configured to provide location information (e.g., longitude and latitude) regarding the current location of the WTRU 902. In addition to, or in lieu of, the information from the GPS chipset 936, the WTRU 902 may receive location information over the air interface 915/916/917 from a base station and/or determine its location based on the timing of the signals being received from two or more nearby base stations. It will be appreciated that the WTRU 102 may acquire location information by way of any suitable location-determination method while remaining consistent with an embodiment.

The processor 918 may further be coupled to other peripherals 938, which may include one or more software and/or hardware modules that provide additional features, functionality and/or wired or wireless connectivity. For example, the peripherals 938 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 10:
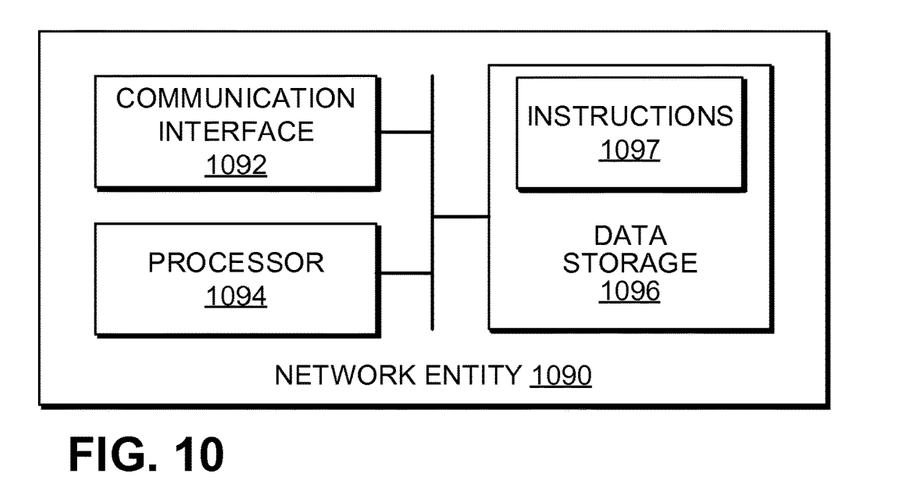
FIG. 10 is a schematic block diagram illustrating the components of an exemplary computer server on which various services may be implemented in some embodiments.

FIG. 10 depicts an exemplary network entity 1090 that may be used in embodiments of the present disclosure, for example as a social networking server. As depicted in FIG. 10, network entity 1090 includes a communication interface 1092, a processor 1094, and non-transitory data storage 1096, all of which are communicatively linked by a bus, network, or other communication path 1098.

Communication interface 1092 may include one or more wired communication interfaces and/or one or more wireless-communication interfaces. With respect to wired communication, communication interface 1092 may include one or more interfaces such as Ethernet interfaces, as an example. With respect to wireless communication, communication interface 1092 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 1092 may be equipped at a scale and with a configuration appropriate for acting on the network side—as opposed to the client side—of wireless communications (e.g., LTE communications, Wi-Fi communications, and the like). Thus, communication interface 1092 may include the appropriate equipment and circuitry (perhaps including multiple transceivers) for serving multiple mobile stations, UEs, or other access terminals in a coverage area.

Processor 1094 may include one or more processors of any type deemed suitable by those of skill in the relevant art, some examples including a general-purpose microprocessor and a dedicated DSP.

Data storage 1096 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 10, data storage 1096 contains program instructions 1097 executable by processor 1094 for carrying out various combinations of the various network-entity functions described herein.

In this disclosure, the terms "first," "second," "third," and so forth, are used herein merely as labels, and are not intended to impose any ordinal requirements on their respective objects.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
receiving a social media update created by a user;
generating a first location-based suggested time delay associated with a first social media recipient;
generating a second location-based suggested time delay associated with a second social media recipient, wherein the second suggested time delay is different from the first location-based suggested time delay;
presenting the first location-based suggested time delay to the user;
receiving a first selected time delay from the user;
presenting the second location-based suggested time delay to the user;
receiving a second selected time delay from the user;
sending the social media update to the first social media recipient only after the first selected time delay received from the user elapses; and
sending the social media update to the second social media recipient only after the second selected time delay elapses.

2. The method of claim 1, wherein presenting the first suggested location-based time delay to the user comprises:
presenting a timeline user interface including a first marker representing the first social media recipient, wherein a first position of the first marker along a timeline represents the first suggested location-based time delay.

3. The method of claim 2, wherein receiving the first selected time delay includes:
receiving user input moving the marker along the timeline from a first position representing the first suggested location-based time delay to a second position representing the first selected time delay.

4. The method of claim 3, wherein the user input is dragging of the marker along the timeline user interface.

5. The method of claim 1, wherein generating the first location-based suggested time delay includes generating a group location-based suggested time delay for a group of which the first social media recipient is a member.

6. The method of claim 1, further comprising displaying at least one calendar event on a timeline user interface.

7. The method of claim 6, wherein the calendar event represents an expected change in the user's location.

8. The method of claim 1, wherein the first location-based suggested time delay is based at least in part on a location of the user.

9. The method of claim 8, further comprising determining a location of the user based at least in part on information in the social media update.

10. The method of claim 9, wherein the information in the social media update includes image metadata.

11. The method of claim 9, wherein the information in the social media update includes text entered by the user.

12. The method of claim 8, wherein the first location-based suggested time delay is based at least in part on a determination of whether the user is away from home.

13. The method of claim 1, wherein presenting the second suggested location-based time delay to the user comprises:
presenting on the timeline user interface a second marker representing the second social media recipient, wherein a first position of the second marker along a timeline represents the second suggested location-based time delay.

14. A method comprising:
receiving a social media update created by a social media user;
generating a first suggested time delay associated with a first social media recipient and a second suggested time delay associated with a second social media recipient;
presenting the first and second suggested time delays to the social media user on a timeline user interface;
receiving selected first and second time delays from the social media user through the timeline interface;
making the social media update available to the first social media recipient only after the first selected time delay received from the social media user elapses; and
making the social media update available to the second social media recipient only after the second selected time delay elapses.

15. The method of claim 14, wherein the timeline user interface includes a first marker representing the first social media recipient and a second marker representing the second social media recipient, wherein a first position of the first marker along a timeline represents the first suggested time delay and a second position of the second marker along the timeline represents the second suggested time delay.

16. The method of claim 15, wherein receiving the first and second selected time delays includes:
receiving user input moving the first marker to a position representing the first selected time delay; and
receiving user input moving the second marker to a position representing the second selected time delay.

17. The method of claim 16, wherein the user input is dragging of the marker along the timeline user interface.

18. The method of claim 14, wherein determining the location of the social media user is based at least in part on information in the social media update.

19. The method of claim 14, further comprising:
determining a location of the social media user;
wherein the first and second suggested time delays are based at least in part on the location of the social media user.

20. A system comprising a processor and a non-transitory computer storage medium storing instructions that operate, when executed on the processor, to perform functions including:
receiving a social media update created by a social media user;
determining a location of the social media user;
based at least in part on the location of the social media user, generating a first suggested time delay associated with a first social media recipient and a second suggested time delay associated with a second social media recipient;
presenting the first and second suggested time delays to the social media user on a timeline user interface;
receiving a selected first and second time delays from the social media user through the timeline interface;
making the social media update available to the social media recipient only after the first selected time delay received from the social media user elapses; and
making the social media update available to the second social media recipient only after the second selected time delay elapses.

* * * * *